United States Patent [19]

Kohno et al.

[11] 4,183,244

[45] Jan. 15, 1980

[54] ULTRASONIC FLOW RATE MEASURING APPARATUS

[75] Inventors: Masaru Kohno; Yukio Nakagawa; Takeo Kada, all of Kawasaki, Japan

[73] Assignee: Fuji Electric Co., Ltd., Kawasaki, Japan

[21] Appl. No.: 928,322

[22] Filed: Jul. 26, 1978

[30] Foreign Application Priority Data

Jul. 26, 1977 [JP] Japan ................................ 52-89404

[51] Int. Cl.$^2$ .............................................. G01F 1/66
[52] U.S. Cl. .................................................. 73/194 A
[58] Field of Search ................................... 73/194 A

[56] References Cited

U.S. PATENT DOCUMENTS

| 3,818,757 | 6/1974 | Brown | 73/194 A |
| 3,869,915 | 3/1975 | Baumoel | 73/194 A |
| 4,028,938 | 6/1977 | Eck | 73/194 A |

*Primary Examiner*—Charles A. Ruehl
*Attorney, Agent, or Firm*—Sughrue, Rothwell, Mion, Zinn and Macpeak

[57] ABSTRACT

In an ultrasonic fluid flow rate measuring apparatus of the type having a pair of electro-acoustical transducers disposed in respective up-stream and down-stream positions relative a fluid flow and the flow rate is obtained from the difference between the oscillation frequencies of first and second oscillation circuits, the present invention includes an abnormality monitoring circuit responsive to a signal H corresponding to the output of the receiving transducer for providing an output signal W when the signal H exceeds an abnormality monitoring voltage $E_1$, a trigger circuit for providing an output signal Z to a time difference detection circuit when the signal H exceeds a set voltage $E_3$ and for providing in response to a signal F an output signal Z to the time difference detection circuit when the signal H exceeds a set voltage $E_{30}$, and a mistrigger detection circuit for providing the output signal F when the output signal W is present and when a signal R from the time difference circuit exceeds a set voltage $E_{61}$. The present invention further includes a delay compensation circuit for delaying by a predetermined period of time the providing of an output signal from a counter to a delay element, the predetermined period of time being set in accordance with the output signal F of the mistrigger detection circuit.

2 Claims, 15 Drawing Figures

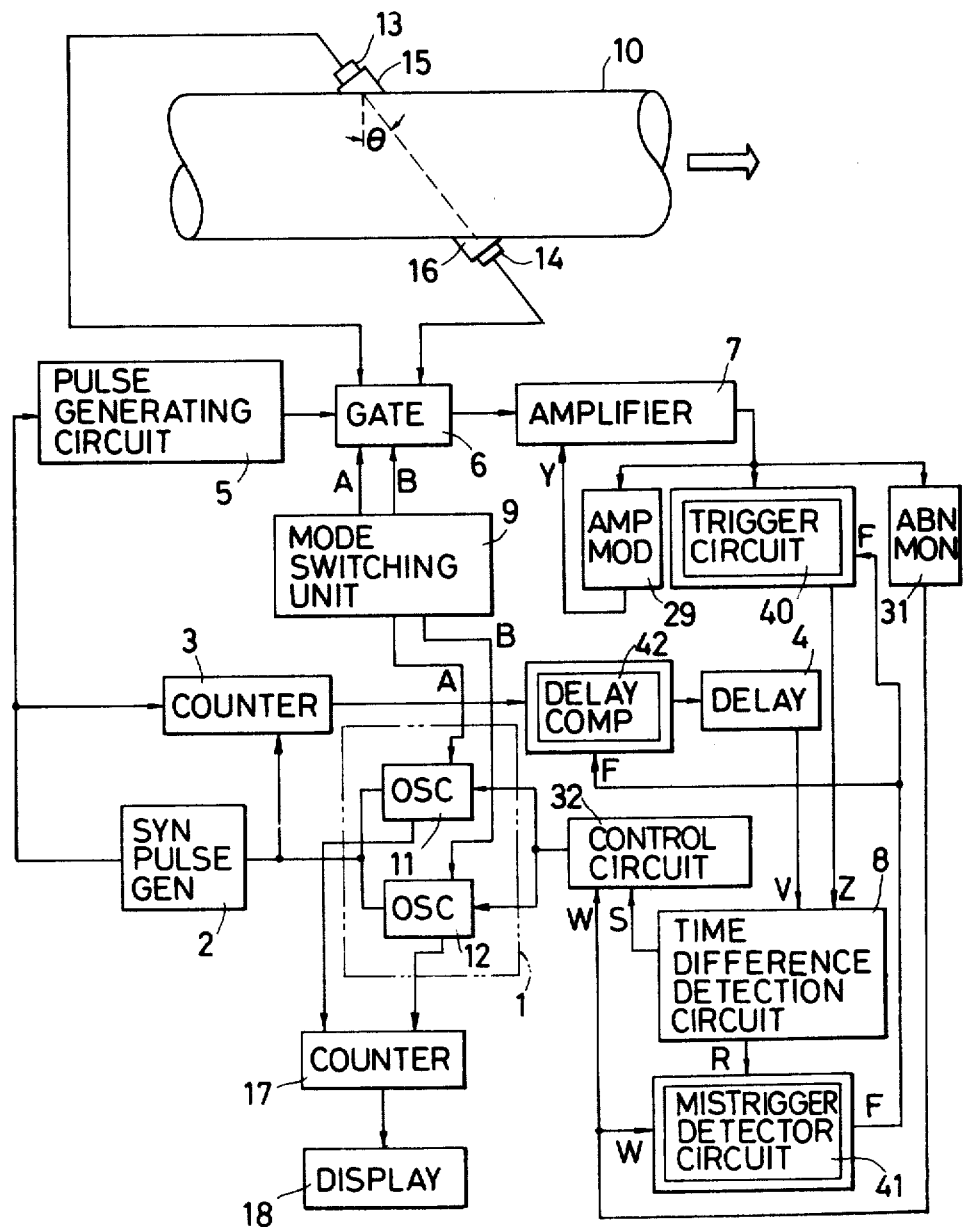

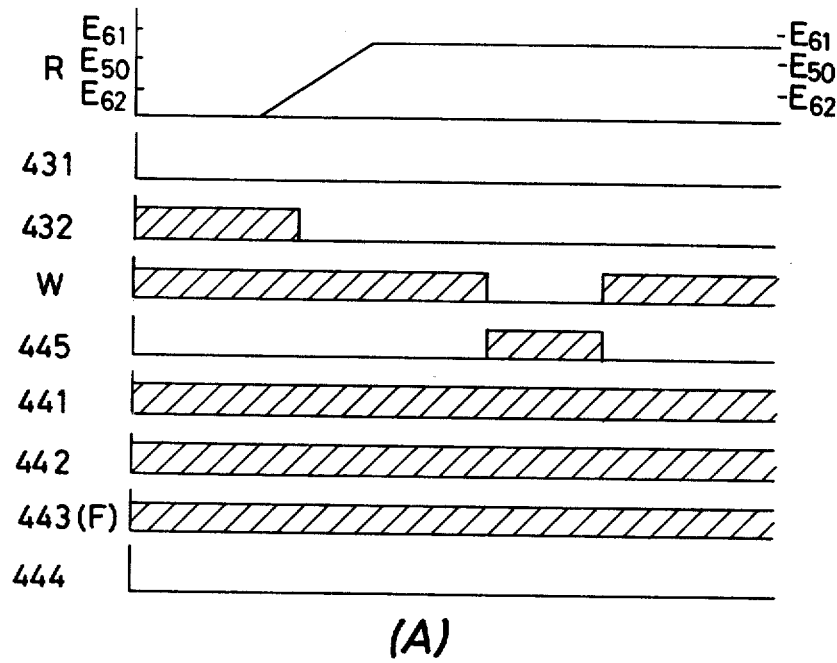
(A)
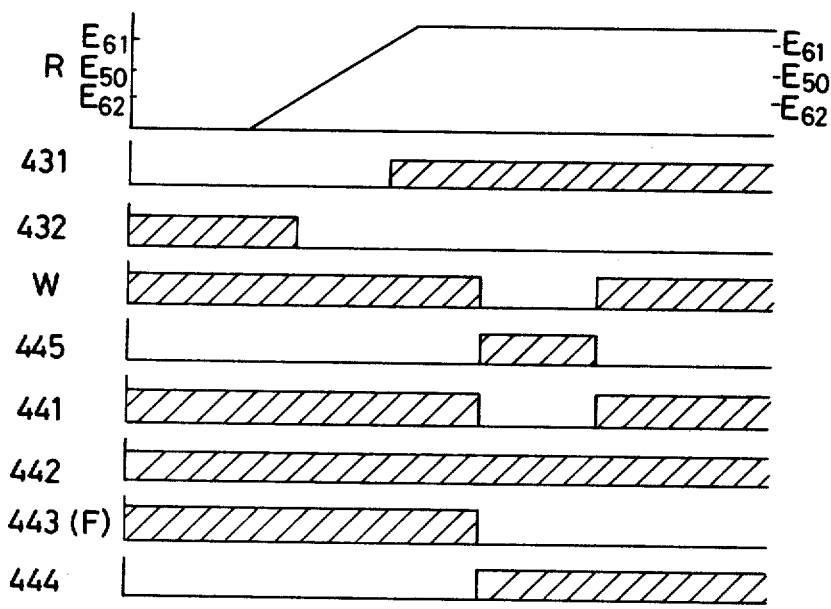
(B)
FIG. 14

ULTRASONIC FLOW RATE MEASURING APPARATUS

BACKGROUND OF THE INVENTION

The present invention relates to an ultrasonic measuring apparatus for measuring the flow speed or flow rate of a fluid flowing through a measuring pipe by the use of an ultrasonic wave.

An ultrasonic fluid flow rate measuring apparatus of the type having a pair of electro-acoustical transducers disposed in respective up-stream and down-stream positions relative a fluid flow and the flow rate or flow speed is obtained from the difference between oscillation frequencies of first and second oscillation circuits are known in the art. For example, such an apparatus is disclosed in Japanese Patent Application (OPI) 130261/1974.

Such conventional apparatus, however, produces measuring errors due to the detected cycle in the received ultrasonic pulse being the preceding or following cycle and not the normal cycle.

SUMMARY OF THE INVENTION

It is an object of the present invention to provide in an ultrasonic flow rate measuring apparatus the capability of determining when the detected cycle in the received ultrasonic pulse is not the normal cycle but is the preceding or following cycle.

It is an object of the present invention to provide in an ultrasonic flow rate measuring apparatus the capability of automatically compensating for the shifting time $\Delta T'$ so as to improve measurement accuracy.

The foregoing and other objects are achieved by the ultrasonic flow rate measuring apparatus of the present invention. An ultrasonic flow rate measuring apparatus of the type having a pair of transducers disposed oppositely on a pipe through which a fluid to be measured flows and controlled alternatively to be in a transmitting mode in which an electrical signal is converted into an acoustical signal and a receiving mode in which receiving acoustical signal is converted into an electrical signal, an electrical pulse generating circuit for exciting the transducer in the transmitting mode, two oscillation circuits whose oscillation frequencies can be varied, a counter which counts the output signal of each oscillation circuit and provides an output signal when the count value of the counter reaches a predetermined value, a delay element for providing a delay time to the output signal of the counter, and a time difference detection circuit responsive to the output signal of the delay element and to the output signal of the receiving transducer. When an ultrasonic wave is emitted in the forward direction of the fluid flow, an output signal from a first oscillation circuit is counted by a counter, the time difference detection circuit detects the time difference between the output signal of the delay element and an output signal of the transducer in the receiving mode, and the oscillation frequency of the first oscillation circuit is controlled so that the time difference is zeroed. When the ultrasonic wave is emitted in the reverse direction of the fluid flow, an output signal from a second oscillation circuit is counted by the counter, the time difference detection circuit detects the time difference between the output signal of the delay element and the output signal of the other transducer in the receiving mode, and the oscillation frequency of the second oscillation circuit is controlled so that the time difference is zeroed, whereby the flow rate of the fluid is obtained from the difference between the oscillation frequencies of the first and second oscillation circuits. The improvement of the present invention includes an abnormality monitoring circuit responsive to a signal H corresponding to the output of the receiving transducer for providing an output signal W when the signal exceeds an abnormality monitoring voltage $E_1$, a trigger circuit for providing an output signal Z to the time difference detection circuit when the signal H exceeds a set voltage $E_3$ and for providing in response to a signal F the output signal Z to the time difference detection circuit when the signal H exceeds a set voltage $E_{30}$ and a mistrigger detection circuit for providing the output signal F when the output signal W is present and when a signal R from the time difference circuit exceeds a set voltage $E_{61}$. The present invention further includes a delay compensation circuit for delaying by a predetermined period of time the providing of the output signal from the counter to the delay element, the predetermined period of time being set in accordance with the output signal F of the mistrigger detection circuit.

BRIEF DESCRIPTION OF THE DRAWINGS

FIG. 11 is a block diagram showing the ultrasonic acoustical flow rate or flow speed measuring apparatus of the present invention;

FIG. 14 is a timing diagram showing the output waveform at various nodes in the circuit of FIG. 13.

DETAILED DESCRIPTION OF THE INVENTION

Figure 1:
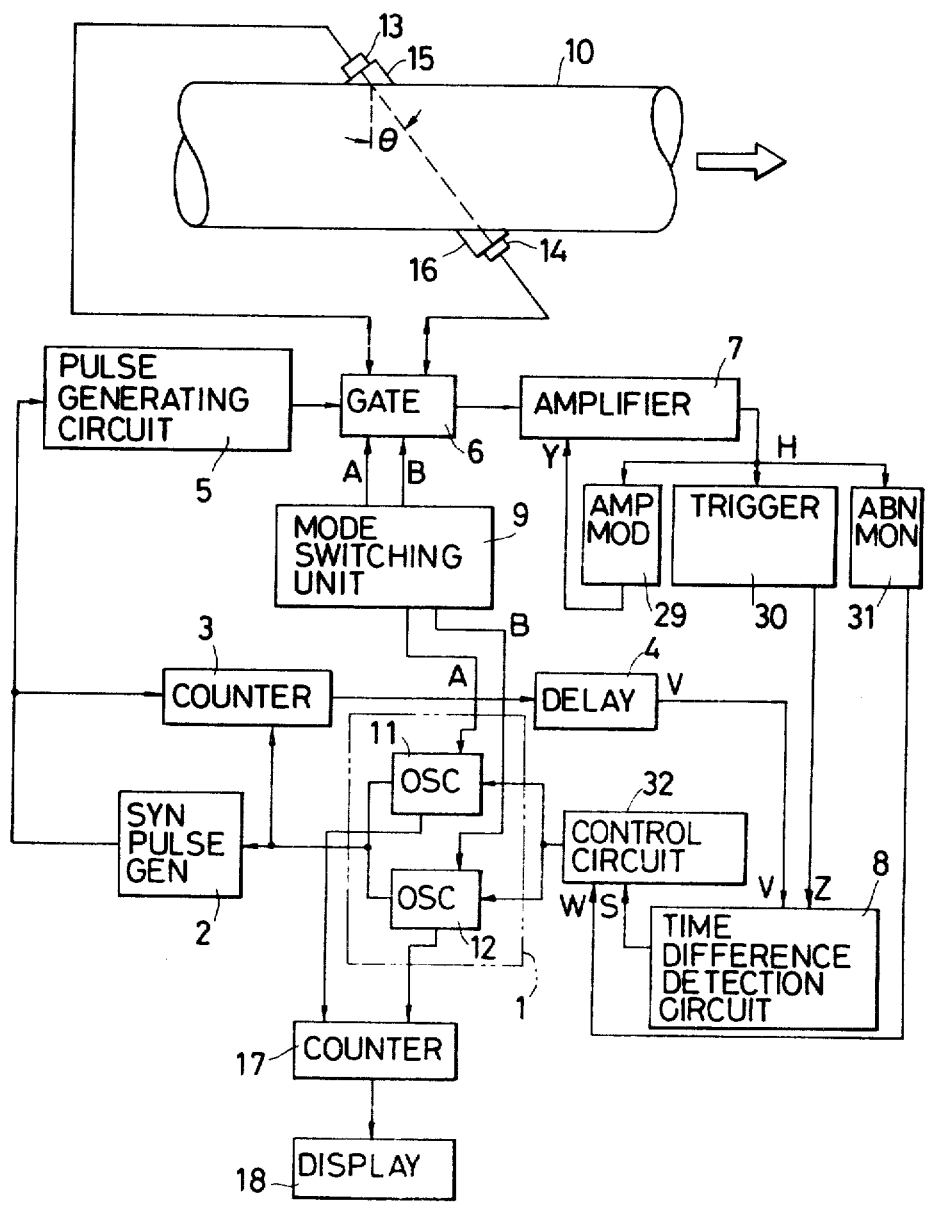
FIG. 1 is a block diagram showing a conventional ultrasonic acoustical flow rate or flow speed measuring apparatus.

A conventional ultrasonic flow meter discussed above and disclosed in Japanese Patent Application (OPI) 130261/1974 is shown in block diagram form in FIG. 1. Reference numeral 10 designates a measuring region or pipe used to measure the flow speed or flow rate of a fluid flowing therethrough in the direction of the arrow. Ultrasonic transducers 13 and 14 are mounted along the outer wall of measuring pipe 10 by mounting elements 15 and 16, respectively. Each of the transducers 13, 14 is capable of transforming an electrical signal into a corresponding acoustical signal and is capable of transforming a received acoustical signal into a corresponding electrical signal. In a first mode, for example, transducer 13 serves as an acoustical transmitting unit while transducer 14 serves as an acoustical receiving unit. In a second mode, for example, transducer 13 serves as an acoustical unit while transducer 14 serves as an acoustical transmitting unit. A mode switching unit 9 permits alternate switching between the two modes of operation of transducers 13 and 14 by providing mode switching signals A and B to a gate circuit 6.

Reference numeral 1 designates an oscillator stage having an oscillator 11 and an oscillator 12. The oscillation frequency of each of the voltage-controlled oscillators 11, 12 is varied in accordance with the output signal from a time difference detection circuit 8.

Oscillators 11, 12 are selectively controlled by the mode switching signals A and B provided by mode switching unit 9 such that when mode switching signal A is provided oscillator 11 receives the output signal from the time difference detection circuit 8, and when mode signal B is provided oscillator 12 receives the output signal from the time difference detection circuit 8. Of course, the function produced by mode signals A and B could be reversed. Reference numeral 2 designates a synchronizing pulse generating circuit which generates an output signal in synchronization with an output signal provided by either one of the oscillators 11 and 12.

A counter 3 operates to count the output signal provided by one of the oscillators 11 or 12 of the oscillator element 1. The counting operation of counter 3 is started in response to the output signal provided by synchronizing pulse generating circuit 2. When the count value of counter 3 reaches a value N, which is preselected in accordance to parameters such as the inside diameter of the measuring pipe 10 and the like, counter 3 outputs a counting operation finish signal to a delay element 4, which, in turn, outputs an output signal V in a predetermined period of time thereafter. The output signal V is applied to the time difference detection circuit 8.

Reference numeral 5 designates an electrical pulse generating circuit which provides an output electrical signal adapted to drive transducers 13 and 14 according to the output signal provided by the synchronizing pulse generating circuit 2. The output electrical signal from electrical pulse generating circuit 5 is selectively applied through gate circuit 6 either to transducer 13 or transducer 14 in accordance with the mode switching signals A and B. The electrical analog of the acoustical signal received by the other of transducer 13 or 14 is applied to an amplifier 7 by gate circuit 6. Output signal H provided by amplifier 7 is applied to an amplitude monitoring circuit 29, a trigger circuit 30, and an abnormality monitoring circuit 31.

Figure 2:
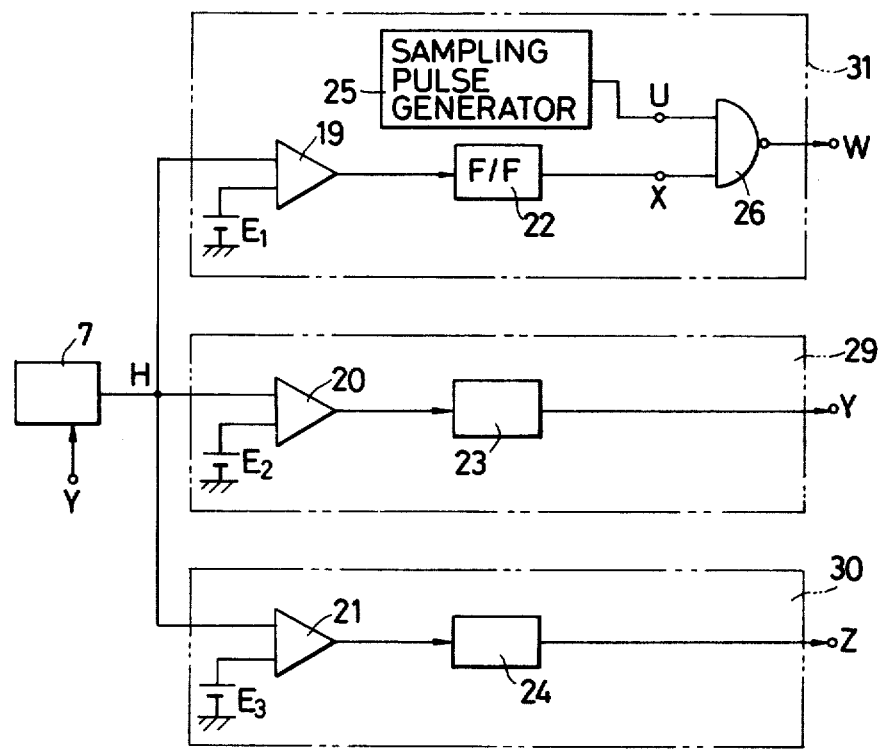
FIG. 2 is a circuit diagram showing stages 29, 30 and 31 of FIG. 1 in greater detail.

Amplitude monitoring circuit 29 limits the maximum peak value of the output signal H from amplifier 7 to a preselected magnitude value irrespective of the magnitude of the electrical analog of the acoustical signal received by transducer 13 or transducer 14. The amplitude monitoring circuit 29, as shown in FIG. 2, includes an amplitude monitoring comparision circuit 20 to which an amplitude monitoring voltage $E_2$ is applied to one input. The output signal H is applied to the other input. The output signal from comparison circuit 20 is applied to a control circuit 23, which, in turn, provides an amplitude control signal Y. Amplitude control signal Y is applied to amplifier 7 to control the amplification factor of amplifier 7.

Trigger circuit 30 monitors whether an ultrasonic acoustic wave has reached the transducer 13 or 14 in the receiving mode, and includes a triggering comparison circuit 21. A reference set voltage $E_3$ is applied to one input of the triggering comparison circuit 21, and the output signal H is applied to the other input. The output of trigger comparison circuit 21 is provided as the input of a control circuit 24, which provides as an output signal the trigger signal Z of the trigger circuit 30. Trigger signal Z is provided to control the time difference detection circuit 8.

The abnormally monitoring circuit 31 monitors whether an ultrasonic acoustical wave has been sonically absorbed by the fluid whose flow rate or flow speed is being measured. The abnormality monitoring circuit 31 includes an abnormality monitoring comparison circuit 19 to which an abnormality monitoring voltage $E_I$ is applied as well as the output signal H, a flip-flop 22 which provides an output signal X according to the output signal from comparison circuit 19 and is reset whenever each measuring period is ended, a sampling pulse generating circuit 25 which provides a sampling pulse U for controlling the timing when the output signal S of the time difference detection circuit 8 is applied to oscillator stage 1, and NAND circuit 26 to which the output signal X from flip-flop 22 and the sampling pulse U from sampling pulse generator circuit 25 are applied. The abnormality monitoring voltage $E_1$, the amplitude monitoring voltage $E_2$ and the set voltage $E_3$ are set to the voltage levels of, for example, 2.5 V, 3 V and 1.5 V, respectively.

Figure 5:
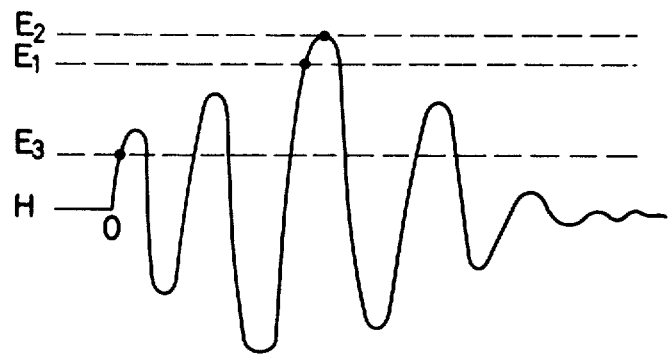
FIGS. 5, 6 and 10 are graphs plotting voltage amplitude in the vertical axis versus time in the horizontal axis showing ultrasonic pulses.

When the output signal H of the amplifier 7 exceeds the set voltage $E_3$ of the trigger circuit 30, as shown in the wave form plot of FIG. 5, the trigger circuit 30 outputs the trigger signal Z. It should be noted that the voltage level of the set voltage $E_3$ is selected such that the arrival of the first half cycle in the wave form signal H can be detected. If the output signal H of amplifier 7 exceeds the abnormality monitoring voltage $E_1$, flip-flop 22 is caused to change state and the output signal X is continuously outputted causing the NAND circuit 26 to provide the output signal W. When the sampling pulse U is provided, however, output signal W is no longer provided by NAND circuit 26.

Figure 3:
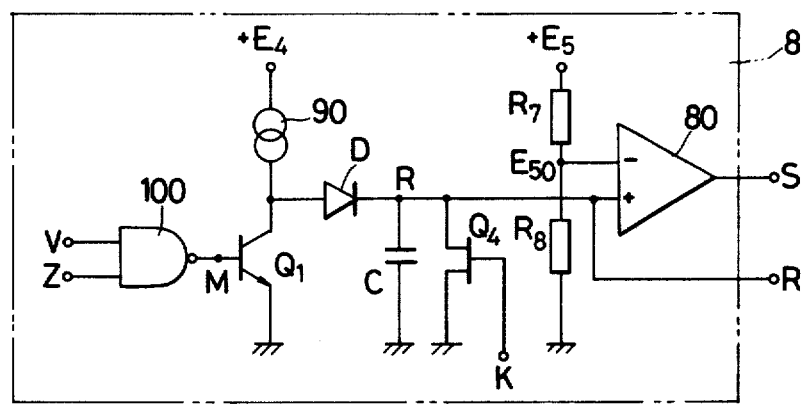
FIG. 3 is a circuit diagram showing stage 8 of FIG. 1 in greater detail.

The time difference detection circuit 8 is illustrated in detail in FIG. 3. At the input side of circuit 8, there is provided a NAND circuit 100 to which the trigger signal Z of the trigger circuit 30 and the output signal V of the delay element 4 are applied. When the trigger signal V coincides with the output signal V and, thus, the output signal M of the NAND circuit 100 is no longer provided, a transistor $Q_1$ is driven to the nonconductive or OFF state. Because transistor $Q_1$ is now in the OFF state, a charging current from a constant current circuit 90 flows into a capacitor C through a diode D and charges the capacitor C.

Constant current circuit 90, diode D and capacitor C form a ramp circuit. The output signal R of the ramp circuit, which is the charged voltage level of the capacitor C, is applied to the positive input of a differential amplifier 80. A propagation time measuring set voltage $E_{50}$ is applied to the negative input of the differential amplifier 80. The difference voltage between set voltage $E_{50}$ and the output signal R of the ramp circuit is provided by the time difference detection circuit 8 as an output signal S. The set voltage $E_{50}$ is approximately 5

V. A field-effect transistor $Q_4$ functions to discharge the capacitor C, and its ON-OFF operation is controlled by a signal K.

The output S of the time difference detection circuit 8 is applied to an oscillator control circuit 32 which controls the operation of the oscillator stage 1.

Figure 4:
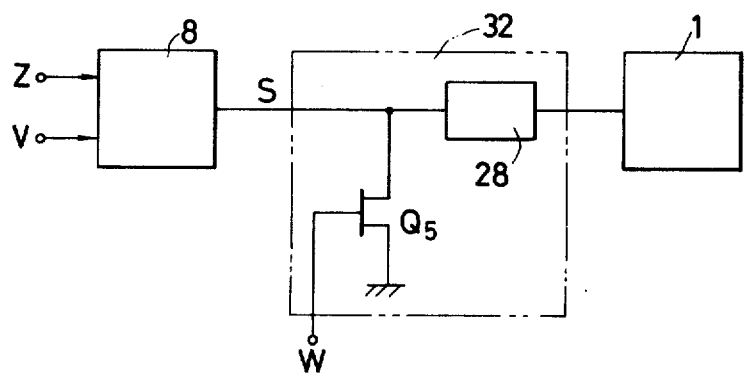
FIG. 4 is a circuit diagram showing stage 32 of FIG. 1 in greater detail.

Control circuit 32, as shown in detail in FIG. 4, includes an integrated circuit 28, and a field-effect transistor $Q_5$. In control circuit 32, when transistor $Q_5$ is rendered nonconductive by the output signal W of the abnormality monitoring circuit 31, the output signal S of the time difference detection circuit 8 is provided by integrated circuit 28 to the oscillator stage 1.

The operation of the conventional ultrasonic flow rate measuring device shown in FIG. 1 is now described with reference to FIG. 7. First, for purposes of explanation, it is assumed that transducer 14 is acting as the ultrasonic acoustical receiving unit due to mode switching signal A from mode switching unit 9, that oscillator 11 in oscillator stage 1 is providing its output to synchronizing pulse generating circuit 2 and to counter 3, and that gate circuit 6 is providing the output signal from pulse generator 5 to transmitting transducer 13 and is providing the electrical analog of the ultrasonic acoustical signal received by transducer 14 to amplifier 7. In this case, when delay element 4 provides its output signal V after the lapse of a predetermined time period, the output signal M from MAND 100 is no longer provided. This causes the charging of capacitor C in the ramp circuit to be started (see FIGS. 2 and 7). Thereafter, when the output signal H from amplifier 7, which corresponds to the output signal from receiving transducer 14, exceeds set voltage $E_3$ of trigger circuit 30, output signal Z from trigger circuit 30 is no longer provided, causing NAND circuit 100 to provide output signal M, which turns transistor $Q_1$ on and stops the charging of the capacitor C in the ramp circuit.

Figure 6:
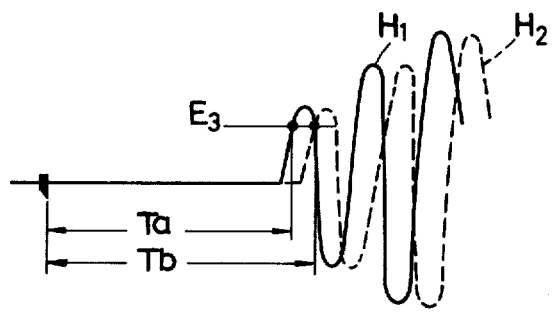

In the present operation example it is assumed that the value of the output signal R of the ramp circuit is represented by $R_1$. The output signal $R_1$ is compared by comparator 80 with set voltage $E_{50}$, and the difference voltage $\epsilon$ therebetween is provided as the output signal S of the time difference detection circuit 8. The oscillation frequency of oscillator 11 is controlled in accordance with the difference voltage $\epsilon$. It should be noted that the control of the oscillation frequency is effected so that the difference voltage $\epsilon$ is reduced to zero, that is, the output voltage $R_1$ becomes equal to the set voltage $E_{50}$. Thus, a forward direction propagation time Ta, as shown in FIG. 6, obtained when an ultrasonic pulse is emitted in a forward direction with respect to the flow of the fluid whose flow rate is being measured is used to set the oscillation frequency of oscillator 11. Thereafter, the measuring period to determine the forward direction propagation time Ta is completed.

Next, because of the presence of mode switching signal B from mode switching circuit 9, transducer 14 is connected to serve as the transmitting unit while transducer 13 is connected to serve as the receiving unit, the output from oscillator 12 of oscillator stage 1 is provided to the synchronizing pulse generating circuit 2 and to the counter 3, and the gate circuit 6 is controlled such that the output signal from the pulse generating circuit 5 is applied to transmitting transducer 14 and the electrical analog of the ultrasonic acoustical signal received by transducer 13 is provided to amplifier 7. In a manner similar to the above-described case, a reverse direction propagation time Tb, as shown in FIG. 6, obtained when an ultrasonic pulse is emitted in a reverse direction with respect to the flow of the fluid whose flow rate is being measured is used to set the oscillation frequency of the oscillator 12. Thereafter, the measuring period to determine the reverse direction propagation time Tb is ended.

The difference between the oscillation frequencies of the oscillators 11 and 12 is picked up by a reversible counter 17 as a frequency difference proportional to the flow speed. A difference signal is provided by counter 17 to a display circuit 18, which displays the difference signal as the flow rate or flow speed of the fluid being measured. It should be noted that in FIG. 6, the signal $H_1$ is a waveform obtained when an ultrasonic pulse is emitted in the forward direction with respect to the flow of a fluid being measured, and the signal $H_2$ is a waveform obtained when an ultrasonic pulse is emitted in the reverse direction.

Sometimes, a fluid whose flow rate is to be measured is pumped from a reservoir through a measuring pipe, and the pumping introduces bubbles into fluid.

Figure 8:
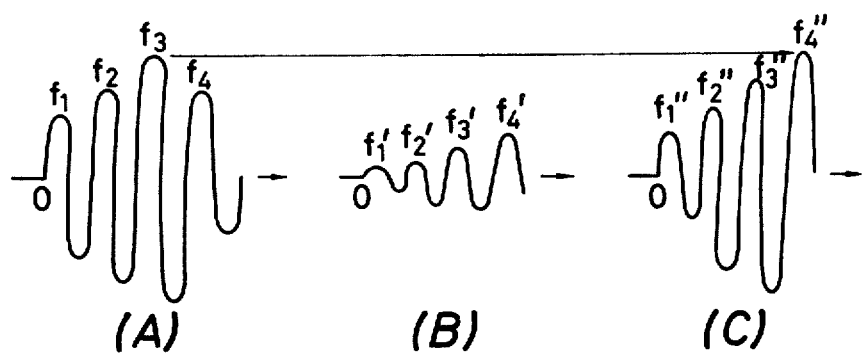
FIGS. 8 and 9 are graphs plotting voltage amplitude in the vertical axis versus time in the horizontal axis showing the attenuation of the ultrasonic pulse produced by bubbles.

The inventors have performed many experiments relating to the effect of bubbles on the accuracy of the measured fluid flow rate or flow speed. It has been discovered that the ultrasonic pulse emitted by the transmitting transducer 13 or 14 is greatly attenuated by the bubbles, and that the attenuation is not uniform from one emitted pulse to the next. Specifically, it has been discovered that when an ultrasonic signal whose third cycle $f_3$ is higher in peak value than the fourth cycle $f_4$ is emitted by the transmitting transducer, as shown in part (A) of FIG. 8, the receiving transducer receives an ultrasonic signal whose third cycle $f_3'$ is lower in peak value than the fourth wave $f_4'$, as shown in part (B) of FIG. 8. If this received ultrasonic signal is amplified by amplifier 7, then output signal waveform from amplifier 7 is as indicated in the part (C) of FIG. 8. With respect to waveform (C), amplification by amplifier 7 is performed so that the maximum point of cycle $f_4''$ is of a preselected amplitude, such as $E_2$, and cycles $f_1''$ and $f_2''$ and $f_3''$ are amplified in accordance therewith.

Figure 9:
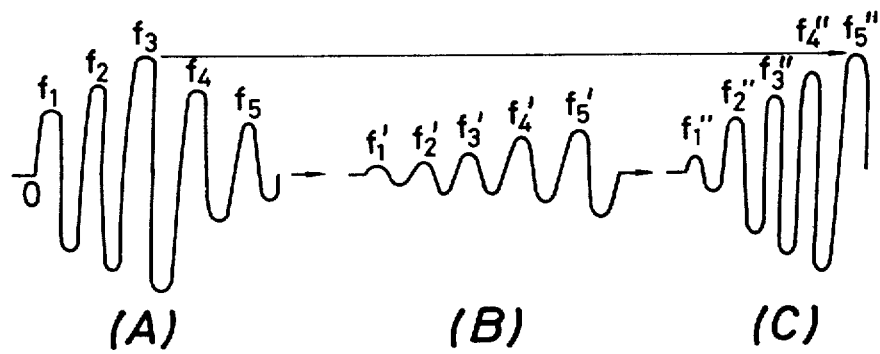

However, in the extreme case the following phenomena have been observed. On the transmission side, the fourth cycle $f_4$ is lower in peak value than the third cycle $f_3$, and the fifth cycle $f_5$ is lower in peak value than the fourth cycle $f_4$. This is shown in part (A) of FIG. 9. On the receiving side, the fourth cycle $f_4'$ is higher in peak value than the third cycle $f_3'$, and the fifth cycle $f_5'$ is higher in peak value than the fourth cycle $f_4'$. This is shown in part (B) of FIG. 8. The inventors attribute this phenomena to the fact that the ultrasonic signal is greatly absorbed by the bubbles at the frequency discontinuity point.

Figure 10:
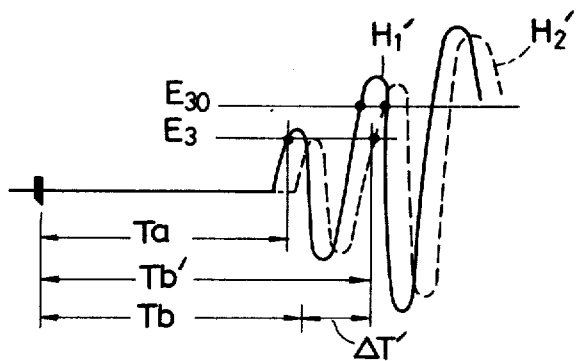

Accordingly, as indicated in FIG. 10, the arrival of the output signal $H_1'$ from amplifier 7 obtained when the ultrasonic signal is emitted in the forward direction with respect to the flow of the fluid to be measured can be detected from the first wave by the trigger circuit 30. However, with respect to the output signal $H_2'$ from amplifier 7 obtained when the ultrasonic signal is emitted in the reverse direction with respect to the flow of the fluid to be measured, because of the excessive sonic absorbed by the bubbles, which causes the first cycle $f_1''$ to be greatly attenuated, the arrival of the output signal $H_2'$ is detected due to second cycle $f_2''$ by the trigger circuit 30 even if the maximum peaks of cycles $f_4''$ and $f_5''$ are made to have the amplitude value of $E_2$. This produces a measurement error corresponding to a period of time of $\Delta T'$, as shown in FIG. 10.

Figure 7:
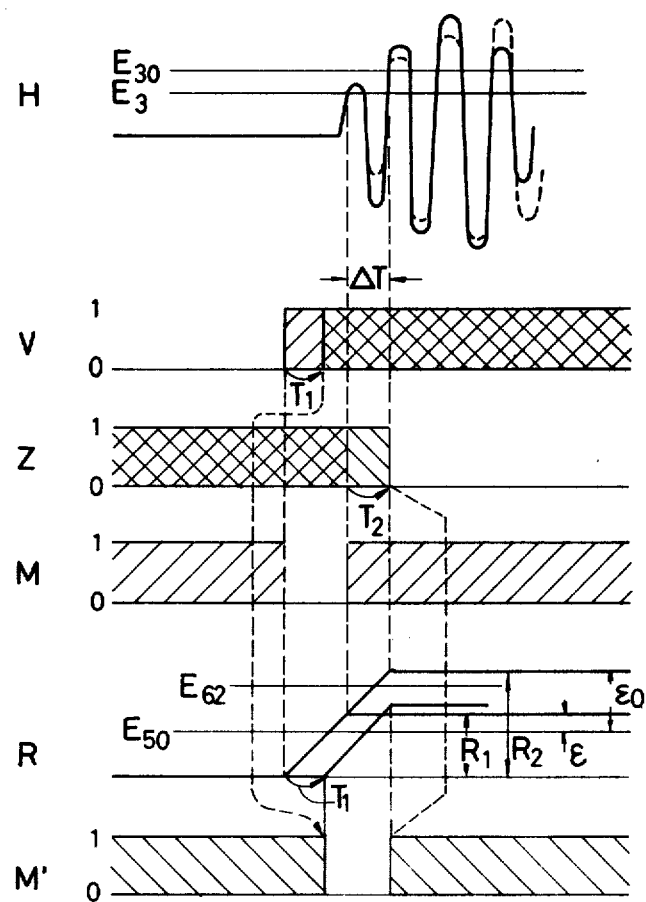
FIG. 7 is a timing diagram showing the operation of the apparatus of FIG. 1.

Thus, in the case where the first cycle output signal H from amplifier 7 does not exceed the set voltage but the second cycle does exceed the set voltage, as indicated in FIG. 7, suspension of output signal Z from trigger circuit 30 is delayed as much as a time $T_2$, which corresponds to the delay time $\Delta T'$ of FIG. 10. Thus, capacitor C in the ramp circuit is excessively charged as much as the delay time $T_2$. In such a case, the value $R_2$ of the output signal R of the ramp circuit is compared with the set value $E_{50}$, causing the measured result to indicate a flow speed higher than the actual flow speed. More specifically, the delay time $\Delta T'$ of the second cycle when compared with the first cycle in the output signal H of amplifier 7 is about 1 $\mu$sec in the case when the ultrasonic frequency is 1 MHz. If, in this connection, the slope of the ramp of the output signal R is 2.5 V/$\mu$sec, then the value $R_2$ is about 7.5 V. If the ultrasonic frequency is 0.5 MHz, then the delay time $T'$ is about 2 $\mu$sec, causing the value $R_2$ to be about 10 V.

The two values of $R_2$, i.e., 7.5 V or 10 V, are compared with the set voltage $E_{50}$, which is 5 V. Accordingly, if the oscillation frequencies of oscillators 11 and 12 are controlled so that the difference signal $\epsilon_0$ therebetween the output signal S of time difference detection circuit 8 is brought to zeroed, then the measurement result exhibits a substantial error.

In the description of operation given above, it has been stated that FIG. 7 shows the output waveforms of various circuits obtained when the ultrasonic pulse is emitted in the forward direction with respect to the flow of the fluid to be measured. However, because forward direction case and the reverse direction case can be described in the same manner, FIG. 7 is employed for a description of the operation in the case of reverse direction.

In the situation where the device is designed to detect the arrival of the ultrasonic pulse by sensing the second cycle, if the peak value of the first wave becomes excessively high, detection of the ultrasonic pulse arrival is shifted to the first cycle, causing the measured to include an error. For instance, in such a case, the output signal R is about 2.5 V when the ultrasonic frequency 1 MHz, and is about 0 V when the ultrasonic frequency 0.5 MHz.

The present invention eliminates the false detection deficiency present in the conventional ultrasonic flow rate or flow speed measuring device as described above by providing an ultrasonic flow speed or flow rate measuring device which produces an automatic time compensation for the shift in detection of the arrival of an ultrasonic pulse when detection is caused by the preceding or following cycle and is not caused by the proper cycle.

The present invention provides the automatic compensation by adding the following circuits having the stated functions. An abnormality monitoring circuit having an abnormality monitoring voltage. When a signal corresponding to the output signal of the receiving transducer exceeds the abnormality monitoring voltage, an output signal is produced. A trigger circuit having at least two set voltage, a first set voltage and a second set voltage. The first set voltage is supplied as a set value for the normal condition. When a signal corresponding to the output signal of the receiving transducer exceeds the first set voltage, an output signal is applied to the time difference circuit. A mistrigger detection circuit having at least one set voltage. When a signal relating to the output signal of the time difference detection circuit exceeds the set voltage, an output signal is produced in accordance with the output signal of the abnormality monitoring circuit, so that the set voltage of the trigger circuit is changed to the second set voltage in accordance with the output signal of the mistrigger detection circuit.

One preferred embodiment of the present invention is now described with reference to FIG. 11. It should be noted that corresponding components between FIGS. 1 and 11 have the same reference numbers.

Figure 12:
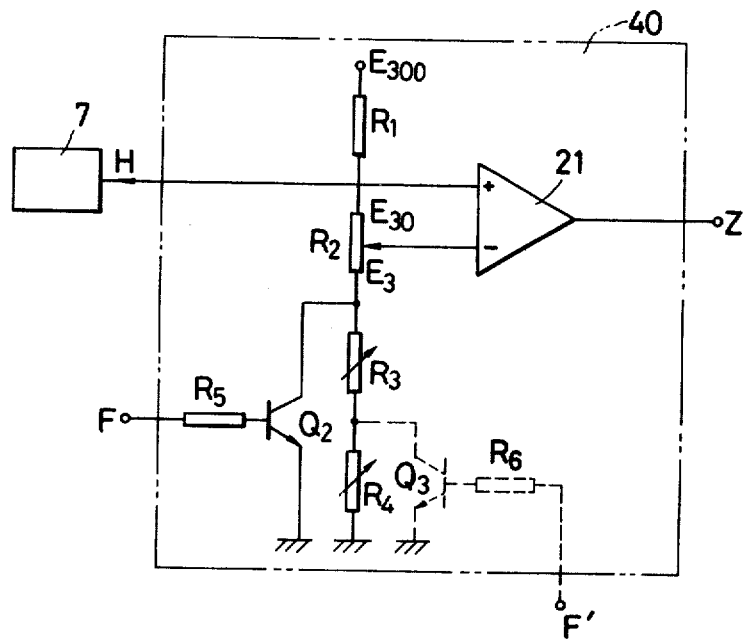
FIG. 12 is a circuit diagram showing stage 40 of FIG. 11 in greater detail.

In a manner similarly to the circuit shown in FIG. 1, the output signal of amplifier 7 is applied to the amplitude monitoring circuit 29, a trigger circuit 40, and the abnormality monitoring circuit 31. In this case, the trigger circuit 40 is so designed that, as shown in FIG. 12, for instance, two set voltages $E_3$ and $E_{30}$ are supplied thereto. For example, when a transistor $Q_2$ is in the conductive or ON state, the set voltage $E_3$ is applied to a comparison circuit 21 through resistors $R_1$ and $R_2$ by an electric source $E_{300}$, and when the transistor $Q_2$ is in the non-conductive or OFF state, the set voltage $E_{30}$ is applied to the comparison circuit 21 by means of the voltage divider of resistors $R_1$, $R_2$, $R_3$ and $R_4$ connected in series to electric source $E_{300}$. The set voltage $E_{30}$ is 2.0 V in this embodiment.

The state of transistor $Q_2$ is controlled via a resistor $R_5$, and transistor $Q_2$ is normally maintained in the conductive or ON state.

Figure 13:
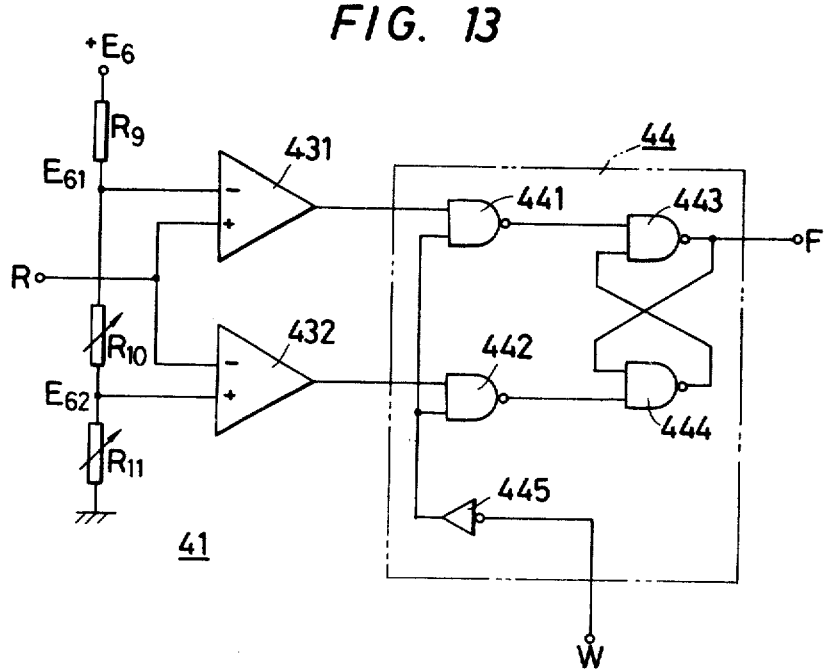
FIG. 13 is a circuit diagram showing state 41 of FIG. 11 in greater detail.

A mistrigger detection circuit 41 is provided in order to determine which received cycle has been detected in the case when the ultrasonic pulse is substantially attenuated. The mistrigger detection circuit 41, as shown in FIG. 13, includes comparison circuits 431 and 432, and an R-S flip-flop 44. Set voltage $E_{61}$ and $E_{62}$ are provided to comparison circuits 431 and 432, respectively, by means of resistors $R_9$, $R_{10}$ and $R_{11}$ and an electric source $E_6$. Set voltage $E_{61}$ and $E_{62}$ have values of about 6 V and 4 V, respectively. The value of set voltage $E_{61}$ is determined by taking into account the fact that if the second cycle is employed as the detecting cycle and the ultrasonic frequency is 1 MHz, then the output signal R of the ramp circuit is about 7 V. On the other hand, the value for set voltage $E_{62}$ is determined by taking into account the fact that in the case where the original detecting cycle is the second cycle, the output signal R of the ramp circuit is about 2.5 V in the same manner as above.

In the present embodiment, the circuitry is designed so that the first cycle is the cycle from which detection should be made. It should be also noted that the output signal R from the ramp circuit is applied to the remaining input terminals of the comparison circuits 431 and 432.

When the output signal R exceeds set voltage $E_{61}$, comparison circuit 431 outputs continuosly an ON or "1" signal, while comparison circuit 432 outputs continuously an OFF or "0" signal. The R-S flip-flop circuit 44 comprises NAND circuits 441, 442, 443 and 444, and a NOT circuit 445. The output signal W of the abnormality monitoring circuit 31 is applied to the input of NOT circuit 445. The output signal F of the mistrigger detection circuit 41 is provided as the output of NAND circuit 443.

The output signal F is normally at a logical level "1" so as to maintain the transistor $Q_2$ in the conductive or ON state, as shown in FIG. 12. FIG. 14 is a waveform diagram showing the outputs of various elements. More specifically, part (A) of FIG. 14 shows waveforms obtained for the case where an ultrasonic pulse is normally detected, or the arrival thereof is detected from the first cycle. Part (B), on the other hand, shows waveforms obtained in the case where an ultrasonic pulse is abnormality detected, or the arrival thereof is detected from the second cycle. As is apparent from part (A) of FIG. 14, in the case where detection of the ultrasonic pulse is normal, the output signal F of the mistrigger detection circuit 41 is maintained unchanged, that is, the signal is maintained in the high or "1" state. On the other hand, as is clear from part (B) of FIG. 14, in the case where detection of the ultrasonic pulse is abnormal, the output signal F of the mistrigger detection circuit 41 is changed to the low or "0" state when the output signal of the abnormality monitoring circuit 31 is provided. This state is maintained unchanged until absorption of the ultrasonic pulse by the fluid flow being measured again returns to the normal condition, as described above. When the output signal F of the mistrigger detection circuit 41 goes to the low or "0" state, transistor $Q_2$ of trigger circuit 40 goes to the non-conductive or OFF state, causing the set voltage $E_{30}$ to be provided to the negative input of comparison circuit 21.

When the set voltage of the trigger circuit 40 is changed to the $E_{30}$ value, as is shown in FIG. 7, the next ultrasonic pulse detection is caused by the second cycle, and not by the first cycle which is detected in the normal case.

If detection of the ultrasonic pulse arrival is shifted from the first cycle to the second cycle, the ultrasonic propagation time is increased by as much as the shifting time, for instance, the amount $\Delta T'$, as shown in FIG. 7. The effect of this shifting time is present in both the forward direction and reverse direction cases. Thus, if it is possible to subtract out the shifting time $\Delta T'$ from the forward direction ultrasonic propagation time and the reverse direction ultrasonic propagation time, then the shifting time problem is eliminated. However, in this embodiment of the present invention, the ultrasonic propagation time is used to control the frequency of the oscillator 11 of 12, and, therefore, the propagation time is employed as the denominator. Thus, it is impossible to completely cancel the shifting time $\Delta T'$ in the present embodiment, and the measured result necessary involves some error, albeit a small one.

In view of the above description, the present invention provides a method of compensating for the shifting time $\Delta T'$ so as to improve measurement accuracy.

More specifically, as shown in FIG. 11, a delay compensation circuit 42 is provided between the counter 3 and the delay element 4 so that when the detection of the ultrasonic pulse arrival is shifted from the first cycle to the second cycle, the outputting of output signal V from delay element 4 is delayed.

Figure 15:
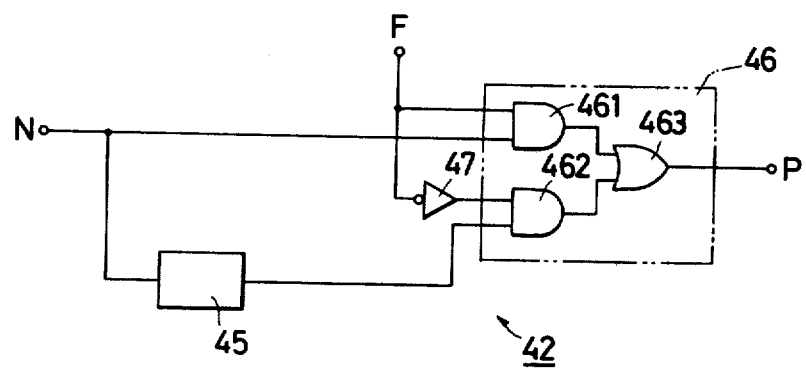
FIG. 15 is a third diagram showing stage 42 of FIG. 11 in greater detail.

The delay compensation circuit 42, as shown in FIG. 15, includes a mono-stable multivibrator 45, a gate circuit 46 and a NOT circuit 17. The gate circuit 46 includes AND circuits 641 and 642, and an OR circuit 463. The output signal F of mistrigger detection circuit 41 is applied to the AND circuit 641 and to the NOT circuit 47.

When the output signal F of the mistrigger detection circuit 41 goes to the low or "0" state, in the next measurement, the output signal provided by counter 3 to delay element 4 is delayed as much as the output generation time $T_1$ of the mono-stable multivibrator 45, as shown by the plots for V and R in FIG. 7. Accordingly, generation of the output signal V of the delay element 4 is delayed as much as the time period $T_1$. The time period $T_1$ is selected so as to be substantially equal to the shifting time $\Delta T'$ required for the ultrasonic pulse arrival detection to shift from the first cycle to the second cycle.

Thus, as is indicated in FIG. 7, shifting time $\Delta T'$ can be compensated for by delaying by an amount of time $T_1$ the time instant when the charging of capacitor C in the ramp circuit of FIG. 3 is started. Reference character M' in FIG. 7 designates the output signal provided the NAND circuit 100 (FIG. 3) when compensation for shifting time $\Delta T'$ is being provided.

As is apparent from the above description, according to the present invention, the mistrigger detection circuit 41 detects when detection of the ultrasonic pulse arrival has shifted from the original detecting cycle to the preceding or following cycle, with the aid of the outut signal W from the abnormality monitoring circuit 31 adapted to monitor whether the ultrasonic pulse is normal, and with the aid of signal R relating to the output signal S of the time difference detection circuit 8. The set voltage of the trigger circuit 40, which is adapted to detect the ultrasonic pulse arrival so as to control the time difference detection circuit 8, is changed in accordance with the output signal F of the mistrigger detection circuit 41. As a result, the ultrasonic pulse arrival detecting wave is changed from the original detecting cycle to the preceding or following cycle in the succeeding measurement, and this cycle is then utilized to detect the ultrasonic wave arrival in both of the forward and reverse directions. Therefore, the measurement accuracy is improved. In addition, the delay compensation circuit 42 is provided according to the present invention so that the rise of the output signal V of the delay element 4, which is applied to the time difference detection circuit 8, is delayed substantially as much as the shifting time 1/T' of the detecting wave, whereby the measurement accuracy is further improved.

In the above-described embodiment of the present invention, on the basis of the output signal F of the mistrigger detection circuit 41, the set voltage of the trigger circuit 40 is automatically changed to the set voltage $E_{30}$ in response to the ON-OFF operation of the transistor $Q_2$. However, it should be noted that the set voltage may also be changed to the set voltage $E_{30}$ as follows. A lamp is provided which is turned on and off by the output signal F of the mistrigger circuit 41. A manual switch is connected in parallel with resistors $R_3$ and $R_4$ instead of the transistor $Q_2$. The set voltage change can be effected by operating the manual switch in accordance with the ON-OFF operation of the lamp.

What is claimed is:

1. In an ultrasonic flow rate measuring device of the type having a pair of transducers disposed oppositely on a pipe through which a fluid to be measured flows and controlled alternately to be in a transmitting mode in which an electric signal is converted into an acoustical signal and a receiving mode in which a received acoustical signal is converted into an electrical signal, an electrical pulse generating circuit for exciting the one of said transducers which is in the transmitting mode, two oscillation circuits whose oscillation frequencies can be varied, a counter which counts the output signal of each oscillation circuit and provides an output signal when the count value of said counter reaches a predetermined value, a delay element for providing a delay time to said output signal of said counter, and a time difference detection circuit responsive to the output signal of said delay element and to the output signal of the one of said transducers in the receiving mode, the improvement comprising:
 (a) an abnormality monitoring circuit responsive to a signal H corresponding to the output of said receiving transducer for providing an output signal W when said signal H exceeds an abnormality monitoring voltage $E_1$;
 (b) a trigger circuit for providing an output signal Z to said time difference detection circuit when said signal H exceeds a set voltage $E_3$ and for providing in response to a signal F said output signal Z to said time difference detection circuit when said signal H exceeds a set voltage $E_{30}$; and
 (c) a mistrigger detection circuit for providing said output signal F when said output signal W is present and when a signal R from said time difference circuit exceeds a set voltage $E_{61}$.

2. The apparatus as recited in claim 1, further comprising a delay compensation circuit for delaying by a predetermined period of time the providing of said output signal from said counter to said delay element, said predetermined period of time being set in accordance with said output signal F of said mistrigger detection circuit.

* * * * *